United States Patent [19]

Deprez et al.

[11] 4,198,066

[45] Apr. 15, 1980

[54] EXPANDABLE ARBOR FOR HOLDING A STACK OF ELEMENTS

[75] Inventors: Thomas A. Deprez; Edwin C. Jaehn, both of Rochester, N.Y.

[73] Assignee: The Gleason Works, Rochester, N.Y.

[21] Appl. No.: 969,912

[22] Filed: Dec. 15, 1978

[51] Int. Cl.² ............................................. B23B 31/40
[52] U.S. Cl. ...................................... 279/2 R; 82/44; 242/56.9; 242/72.1; 269/48.1; 279/1 G
[58] Field of Search ............ 279/2 R, 2 A, 1 G, 1 W; 82/44; 269/48.1; 242/72.1, 56.9

[56] References Cited

U.S. PATENT DOCUMENTS

| | | | |
|---|---|---|---|
| 2,573,298 | 11/1951 | Peter | 279/2 R |
| 2,734,749 | 2/1956 | Benjamin | 279/2 R |
| 2,755,093 | 7/1956 | Peter et al. | 279/2 R |
| 3,009,747 | 11/1961 | Pitzer | 308/71 |
| 3,073,610 | 1/1963 | Mackinder et al. | 279/2 R |
| 3,192,820 | 7/1965 | Pitzer | 85/69 |
| 3,517,939 | 6/1970 | Jaehn | 279/2 R |
| 3,844,546 | 10/1974 | Greenberg | 269/48.1 X |
| 3,997,176 | 12/1976 | Wyckoff et al. | 279/2 R |

FOREIGN PATENT DOCUMENTS

| | | | |
|---|---|---|---|
| 1502356 | 5/1969 | Fed. Rep. of Germany | 269/48.1 |
| 500914 | 10/1976 | U.S.S.R. | 279/2 R |

*Primary Examiner*—Z. R. Bilinsky
*Attorney, Agent, or Firm*—Morton A. Polster; Ralph E. Harper

[57] ABSTRACT

An arbor is provided with a series of expandable collets for clamping a series of workpieces or other elements. The collets are designed with a variable force requirement for effecting expansion, and this assures sequential clamping of a series of workpieces or elements.

11 Claims, 5 Drawing Figures

EXPANDABLE ARBOR FOR HOLDING A STACK OF ELEMENTS

BACKGROUND AND BRIEF DESCRIPTION OF INVENTION

This invention relates to an arbor which can be mechanically expanded to clamp a series of workpieces or other elements when the workpieces are positioned in a face-to-face relationship along the length of the arbor. More specifically, the arbor is characterized by structural features which provide for progressive clamping of a series of workpieces in a sequence beginning at one end of the arbor and ending at an opposite end thereof.

Various types of expandable arbors have been devised for clamping and securing one or more workpieces or other elements having cylindrical bores therethrough. It is known, for example, to utilize a series of expandable collets, or similar structures, which can be expanded through a wedging action of such collets against one another or against adjacent structures having tapered surfaces similar to those on the individual collets. The collets themselves are typically formed with one or more slots that permit a circumferential expansion of the collet as it is wedged in an axial direction against a mating structure. Patents showing representative structures of this type include U.S. Pat. Nos. 2,573,928; 2,734,749; 2,755,093; 3,073,610; 3,009,747; and 3,192,820.

As shown in U.S. Pat. Nos. 2,573,928 and 3,073,610, it is also known to provide for the clamping of a series of stacked workpieces or other elements with an arbor made up of a sufficient number of expanding collets to match the number of workpieces or elements to be clamped. FIG. 6 of the U.S. Pat. No. 2,573,928 illustrates the clamping of a series of separate milling cutters on a series of rings which can be mechanically expanded to grip the bores of the separate milling cutters. The drawings of U.S. Pat. No. 3,073,610 show a similar arrangement for a series of stacked workpieces which are gripped at their central bores through an expansion of rubber rings.

The present invention is primarily concerned with solving a problem of clamping a number of cylindrical workpieces for the purpose of holding a stack of such workpieces in a very rigid and known relationship to cutting or grinding elements functioning to form the stack of workpieces into a number of identical spur or helical gears. The workpieces themselves have a characteristic of being manufactured within a limited tolerance range for dimensions of their central bores and their outside diameters. In attempting to apply known principles of clamping to the requirements of this job, it was soon learned that there are a number of difficulties in achieving complete, rigid clamping of each of a series of workpieces with an arbor having a series of collets for being expanded into engagement with the individual bores of the workpieces. Very slight differences in bore sizes create a special problem of achieving a complete clamping of each and every such workpiece through the use of expanding collets which are mechanically compressed together in an axial direction to achieve radial expansion of the individual collets of the series. It was found, for example, that an undersized workpiece in the middle of the stack will tend to disrupt a progressive expansion of each adjacent collet in the series, and workpieces above or below the position of the undersized part might receive insufficient clamping from their associated collets as a result of this disruption in sequential clamping.

In order to solve this problem, it was decided to attempt to achieve a more certain sequencing of expansion of individual collets in the series, and it was decided to devise means for carrying out initial clamping at an end of the series which is remote from the end to which a clamping force is applied. After clamping is achieved at the one end of the stack of workpieces, each successive workpiece is then clamped in a sequence which progresses from the end of the first clamping to the opposite end of the stack. In this manner, full and complete clamping of each workpiece can be achieved.

In order to accomplish such sequential clamping, the arbor of this invention was designed with a variable force requirement for expanding each collet in a series of such collets, and the variable force requirement is progressively greater toward one end of the series than it is toward an opposite end thereof. One way of providing such a variable force requirement for individual collets is to design the separate collets of a series with variable spring rates. "Spring rate" as used in the descriptions herein is intended to describe the ease with which a metal, or other material, collet can be expanded radially from its normal configuration when it is at rest. Variable spring rate can be provided by varying the thickness of the material from which each collet is manufactured or by varying the number of slots formed in the individual collets. Maximum variation can be achieved by combining variations in thickness and number of slots.

Another way of providing a variable force requirement for expanding a series of collets is to vary the outside diameters of the individual collets so that a greater force will be required to expand a smaller diameter collet out to its gripping position when compared with the force required to expand a larger diameter collet out to a similar gripping position. This type of variation in collet design can be combined with the variations in material thickness and number of slots if desired.

In a specific embodiment of the invention an arbor is provided for clamping and holding a stack of cylindrical workpieces while the workpieces are manufactured into spur or helical gears. The arbor includes a series of expandable collets equal in number to the number of workpieces to be carried by the arbor, and each collet comprises a cylindrical member having a base portion for contacting the hub of the arbor and an expandable portion for contacting the bore of a workpiece to be held by the arbor. The base portion of each collet carries an outer tapered surface, and the expandable portion of each collet has an inner tapered surface for mating with the outer tapered surface of the base portion of a next adjacent collet when a series of such collets are stacked in overlapping relationship on the hub of the arbor. In this way, the collets can be expanded by an axial movement of a first collet into wedging engagement with a next adjacent collet, with the movement being transmitted down the entire series until a last collet of the series is reached.

In order to provide a needed sequence of clamping of the individual collets, it is important that axial movement of the entire series of collets takes place before a collet at a remote end from the end to which the clamping force is applied is radially expanded to effect a clamping of its associated workpiece. This is done by varying the spring rates, the number of slots, or the outside diameters of the individual collets in the series so that the last collet of the series is more easily radially expanded to its full gripping position before each successive collet is expanded to its respective gripping position.

In addition to utilizing a variable force requirement for expanding the series of collets, the invention may optionally utilize a series of rings carried on the arbor in positions between each workpiece placed on the arbor. The rings carry pin members for insertion into openings formed into the workpieces to effectively secure each of the workpieces of the stack to other workpieces of the stack.

These and other features of the invention will become more apparent in the detailed discussion which follows. In that discussion, reference will be made to the accompanying drawings, as briefly described below.

DETAILED DESCRIPTION OF INVENTION

Figure 1:
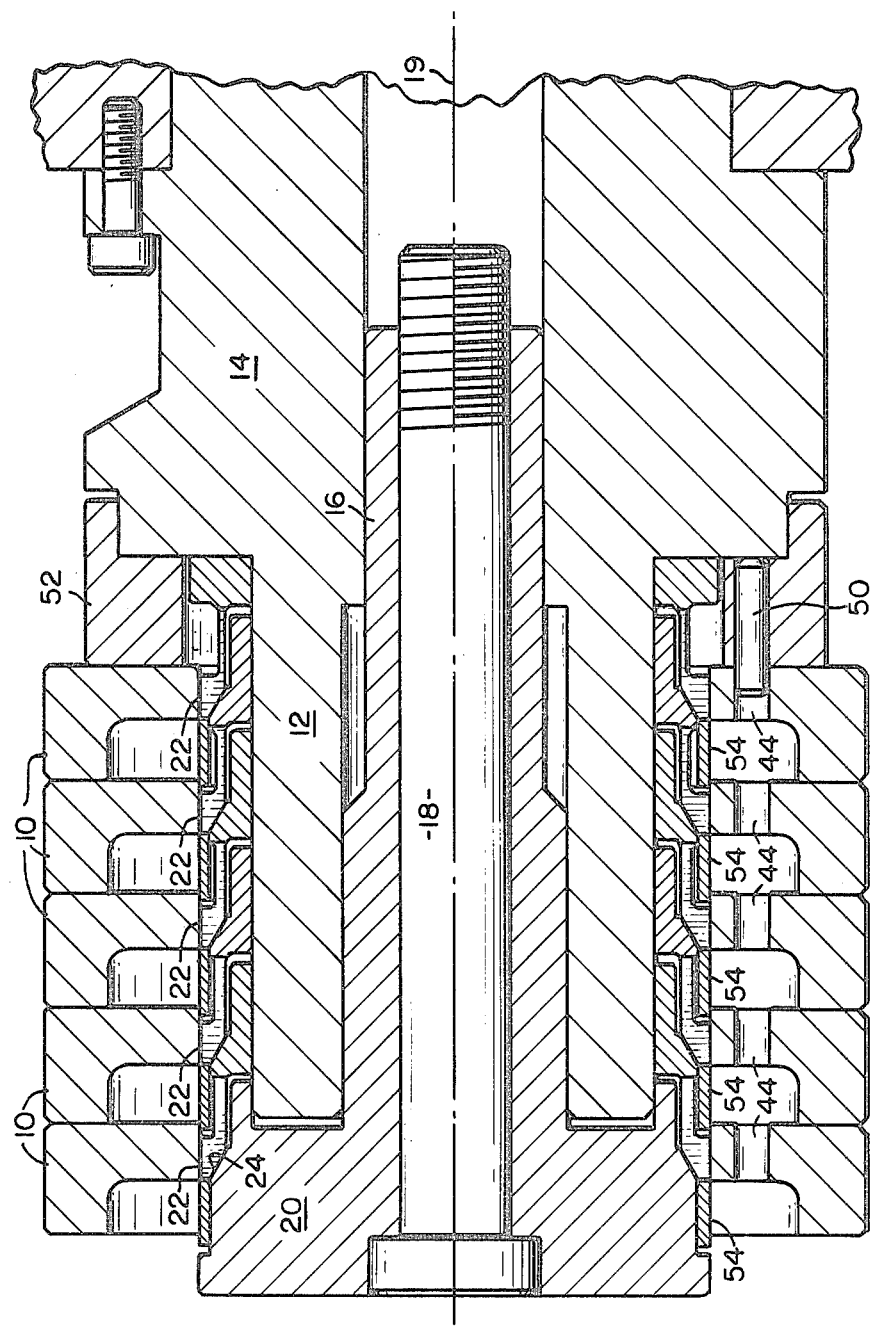
FIG. 1 is a cross-sectional view of an arbor assembly carrying a number of workpieces in accordance with the present invention.

Referring to FIG. 1, the arbor of this invention is illustrated with reference to an assembly designed for clamping and holding five workpieces 10 while the workpieces are cut or otherwise formed into spur or helical gears. A greater or lesser number of workpieces may be accomodated in any given design, and the illustration of FIG. 1 is only a single example of the type of design available with the improvements of the present invention.

As shown, the assembly includes a cylindrical hub 12 which has a base portion 14 secured to a work spindle of a machine. The hub 12 has a bore therethrough for receiving a fitted tubular member 16 and its associated actuating rod 18. The actuating rod 18 is, in turn, fastened to a connecting rod or similar structure (not shown) for being axially advanced or retracted along a central axis 19 of the arbor. Such movement of the actuating rod 18 carries with it the tubular member 16. A head portion 20 of the tubular member 16 functions to transmit clamping and unclamping motions to a series of collets 22 arranged along the hub 12 of the assembly. The assembly is illustrated in a declamped condition which is the result of having moved the actuating rod 18 toward the left in the FIG. 1 view and to a limit position in which the head portion 20 and its wedging surface 24 are carried out of tight contact with the series of collets 22. When the actuating rod is moved toward the right of the FIG. 1 view, an axial force is transmitted from the head portion 20 (by way of its wedging surface 24) to the first adjacent collet 22 and to each succeeding collet to the opposite end of the series. It can be seen that a premature radial expansion and full engagement of the first collet 22 with a first workpiece 10 (at the left of the FIG. 1 view) could result in a loss of axial force transmittal from that collet to the remaining collets of the series. This could result if the first workpiece is slightly undersized in its central bore diameter, for example. A similar interference with uniform force transmittal could occur at any position in this stack of workpieces if a similar undersized condition should exist. In order to prevent this, the arbor is designed with a variable force requirement for expanding each of the separate collets 22 of the series. This is accomplished by designing the first collet 22 nearest the head portion 20 in such a way that it will not reach full expansion as easily as the last collet 22 at the opposite end of the series. Intermediate collets are designed with incremental differences in expansion characteristics which provide for a progressive sequence of expansion from one end of the arbor to the other.

Figures 2, 3:
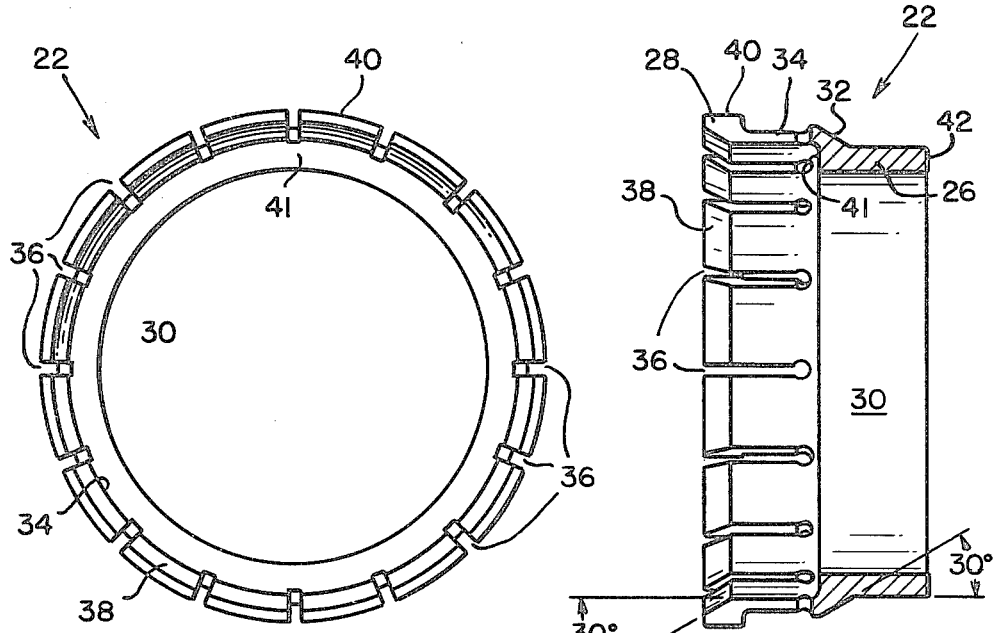
FIG. 2 is an elevational view, partly in section, of a single collet from the assembly of FIG. 1, as seen in the same scale as that of FIG. 1.
FIG. 3 is an end elevational view of the collet of FIG. 2.
Figure 4:
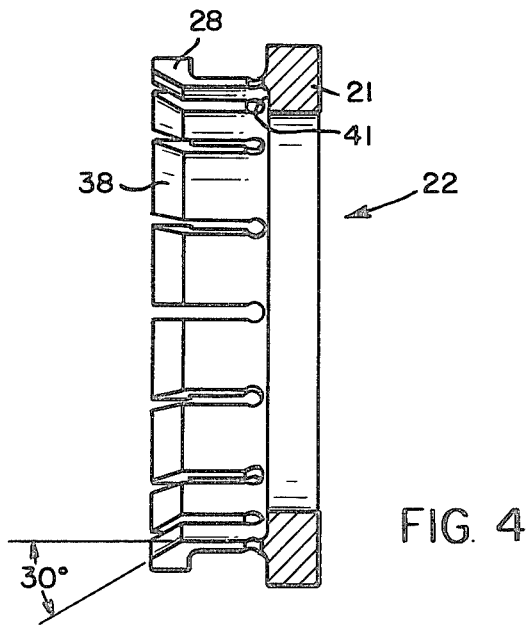
FIG. 4 is a view similar to FIG. 2, showing an end collet structure for the assembly of FIG. 1.

There are several ways of providing for the variable expansion rate of individual collets required for the arbor of this invention. Referring to FIGS. 2 and 3, it can be seen that each collet 22 includes a base portion 26 and an expandable portion 28. The base and expandable portions are formed integrally as a single structure in the illustrated embodiment, but could be formed as separate components for carrying out needed functions as an alternative form of structure. The base portion 26 includes a relatively long inner circumference surface 30 for sliding on the hub 12 of the arbor assembly. The length of this surface 30 is important because it serves to stabilize the relationship of the collet to the hub of the arbor and to lessen a tendency for the collet to twist or bend relative to the axis of the arbor. This assures a smooth transmittal of force from one end of the collet series to the other end thereof. The base portion 26 carries a tapered surface 32 in the form of a frusto-conical exterior surface on the collet. The function of this tapered surface will be discussed with reference to its relationship to an adjoining collet structure.

The expandable portion 28 of each collet 22 includes a relatively thin web section 34 which gives flexibility to the expandable portion. In addition, a number of slots 36 are formed into the expandable portion of the collet to accomodate a radially outward expansion of the flexible portion. In the illustrated embodiment, sixteen slots are provided, but greater or lesser numbers may be used. The expandable portion 28 includes an inner frusto-conical surface 38 which is of the same taper as the frusto-conical surface 32 of the base portion. The tapered surfaces 32 and 38 must contain a sufficient angle to assure an easy release of the collets from their clamped to their unclamped conditions. Angles within the range of twenty to thirty-five degrees satisfy this function, but a wider range of angles may satisfy workholding requirements that are different than those described herein. It can be seen from the FIG. 1 view that the collets can be stacked in overlapping relationship to one another so that the tapered surface 38 of each expandable portion engages the tapered surface 32 of a next adjacent collet. Thus, when an axial clamping force is applied to the entire series of collets, a wedging action takes place between individual collets, and the expandable portions 28 tend to expand radially outwardly. The expandable portion 28 can be made more or less flexible by changing the thickness of the web 34 or by increasing or decreasing the number of slots 36 formed therein. Alternatively, the outside diameter of the flexible web portion taken at the cylindrical surface 40 can be made smaller or larger to thereby require a greater or lesser amount of flexing (and therefore a corresponding difference in the force required to effect such expanding) before the surface 40 reaches a full clamping position with the internal bore of a workpiece or other element being clamped thereby.

Individual collets are also designed and dimensioned so that end surfaces 41 and 42 function as stops for limiting the axial compressive movement of the series of collets. Normally, these surfaces do not contact one another, even when the arbor is in a clamping mode, but in the event of a collet not being restrained by a workpiece (due to absence of a workpiece or a greatly oversized bore of a workpiece) the stops 41 and 42 serve to prevent unlimited expansion (and breakage) of any of the collets.

As an example of an actual arbor construction utilizing the principles of this invention, a series of five collets of the type shown in FIG. 1 was manufactured with a difference of thickness of the web portion 34 of each succeeding collet being 0.02 inches. The thickest webs were located at the end of the assembly nearest the head portion 20 (toward the left of FIG. 1) and the thinnest webs were located at the opposite end of the arbor. In the same assembly, the outside diameters of the individual collets (as taken at the surface 40 of each collet) were varied by 0.002 inches from collet to collet. The smallest diameter collet was positioned at the clamping end (to the left, FIG. 1) of the arbor while the largest diameter collet was positioned at the opposite end. The number of slots 36 were varied in each collet such that the collet in the extreme left position in Figure contained eight slots, the next adjacent collet contained ten slots, the third collet contained twelve slots, and the last two collets contained sixteen slots each. The angles of the tapered surfaces 32 and 38 were thirty degrees (as shown in FIG. 2).

Figure 5:
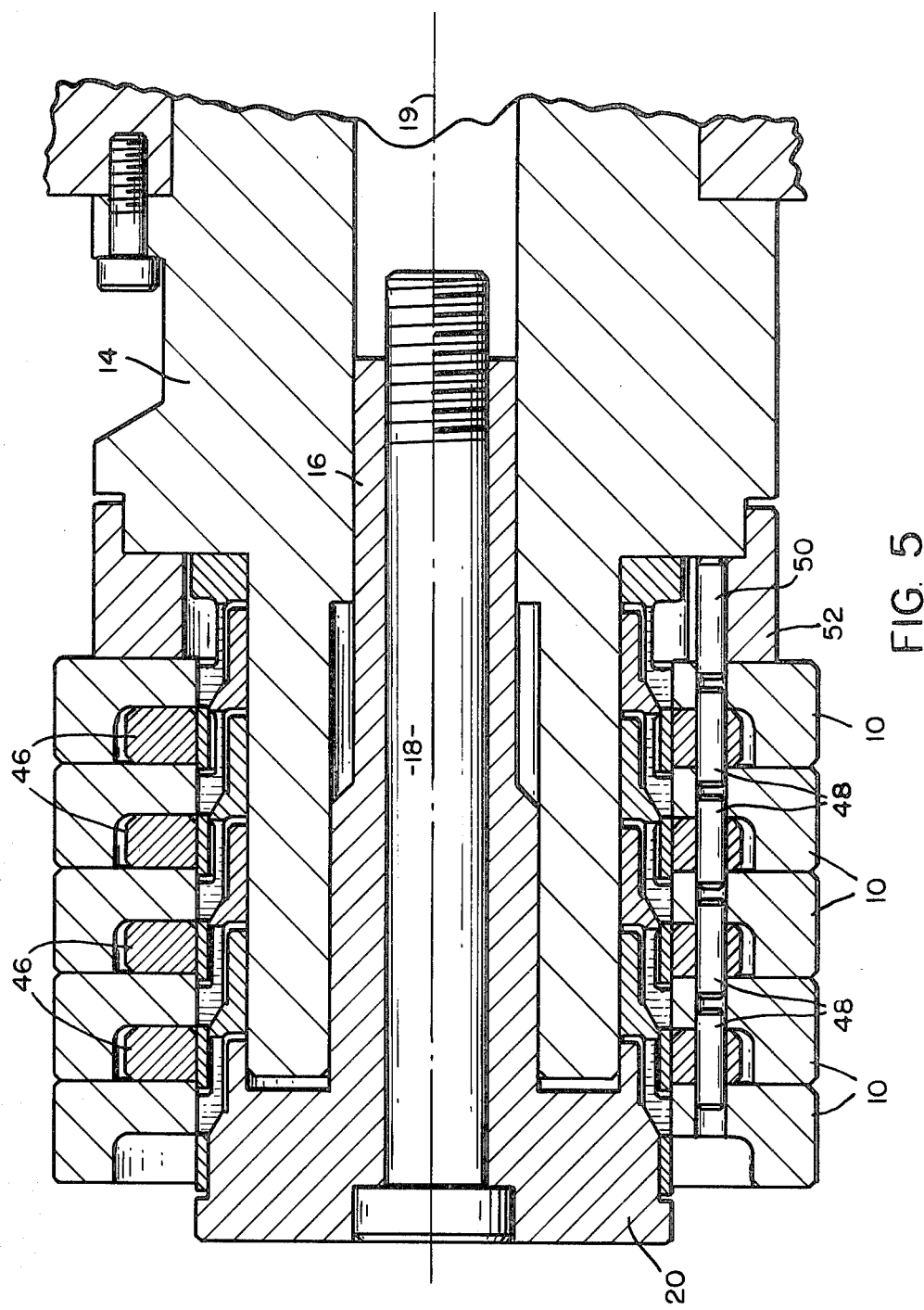
FIG. 5 is a cross-sectional view of a stack of gears with associated rings for maintaining alignment of the workpieces when clamped on an arbor of the type shown in FIG. 1.

The workpieces 10 which are illustrated in FIGS. 1 and 5 represent gear blanks from which spur or helical gears are formed with cutting or grinding equipment associated with whatever machine is utilizing the arbor of this invention. Gear blanks of this type may include a number of mounting bores 44 (FIG. 1) which are formed through the gear blanks for ultimately receiving bolts or fasteners for securing each gear to a spindle or drive shaft component. These mounting bores 44 can be optionally used to further control the position of each gear in a stack of such gears held on an arbor through the use of ring members 46 (See FIG. 5) which are fitted between the gear blanks 10 as the gear blanks are stacked, one-by-one, on the arbor. Each ring member 46 comprises an annular ring having one or more pins 48 fixed therein so as to be in alignment with the mounting bores 44 of the gear blanks 10 when they are placed on an arbor. The pin members 48 are of a diameter that can be easily received within the mounting bores 44. In addition, a permanently located pin member 50 is carried on a base ring 52 so that all gear blanks and rings 46 are effectively secured to the fixed base 52 when the gear blanks are stacked on the arbor. This arrangement is not really needed for the job shown but may be used in special situations to further control any tendency for a workpiece of a series to slip and rotate relative to the remaining workpiece of the series. Most uses of the arbor of this invention will not require the additional control feature just described, but precision forming operations, such as gear cutting or grinding, may be aided by this additional control feature.

FIG. 1 also illustrates the use of sleeve elements 54 which are carried between the separate collets of the arbor assembly. These sleeve elements function to span a gap that would otherwise exist between adjoining collets and to thereby present a smooth mounting surface for reception of individual gears of the stack. In this way, gears can be more readily loaded onto the arbor and moved to their respective positions without dropping or hanging up between individual collet members.

Although the invention has been described with reference to a single embodiment, it can be appreciated that many variations of this embodiment fall within the scope of the intended invention. Also, the arbor can be oriented differently than shown, and in an actual use of the arbor the orientation was on a vertical axis. Accordingly, the claims appended hereto should be interpreted in light of the specific disclosures herein and any equivalent structures that may be substituted for those that have been specifically disclosed.

What is claimed is:

1. An arbor for clamping more than one element having a cylindrical bore therethrough, said arbor being of the type which includes a series of expandable collets which are equal in number to the number of elements to be clamped, and said series of collets being arranged on a hub along a common axis of the arbor so that the elements can be stacked along said axis with each element being positioned around a collet of the series, said arbor being characterized by said series of collets having a varying force requirement for expanding individual collets in the series, said varying force requirement being progressively greater towards a first end of said series than towards a second end thereof so as to produce sequential clamping of a stack of elements beginning with a clamping of an element at the first end of the stack in which the least amount of force is required for expanding an associated collet and ending with a clamping of an element at the second end of the stack in which the greatest amount of force is required for expanding an associated collet and wherein said first end of the stack is remote from the end of the stack to which the clamping force is applied.

2. The arbor of claim 1 wherein said series of collets is designed with progressively varying spring rates for individual collets as a progression is made from a first end of the arbor to a second end of the arbor.

3. The arbor of claim 2 wherein said varying spring rate is provided by a varying thickness of material from which the collets are manufactured.

4. The arbor of claim 2 wherein said varying spring rate is provided by a varying number of slots formed in individual collets.

5. The arbor of claim 1 wherein said collets have outside diameters for contacting the bores of said elements, and wherein said series of collets is designed with progressively varying outside diameters for individual collets as a progression is made from a first end of the arbor to a second end of the arbor.

6. The arbor of claim 1 wherein each of said collets comprises a cylindrical member having an inner circumference base portion for contacting a hub of the arbor and an outer circumference expandable portion for contacting an element to be held by the arbor, and wherein said outer expandable portion includes an inner frusto-conical surface for bearing against an outer frusto-conical surface on the base portion of a next adjacent collet when the collets are stacked in overlapping relationship on the hub of the arbor.

7. The arbor of claim 6 wherein said frusto-conical surfaces on said outer expandable portions of the collets form an angle to the axis of the arbor within the range of 20 degrees to 35 degrees.

8. The arbor of claim 1 and including a series of rings to be carried on said arbor in positions between each workpiece placed thereon, said rings having pin members extending from opposite faces thereof for being inserted into openings formed in the workpieces, to thereby secure the rotational positioning of each workpiece relative to the arbor.

9. An arbor for clamping and holding a stack of cylindrical workpieces while the workpieces are manufactured into spur or helical gears, said arbor being of a type which includes a series of expandable collets arranged on a common axis of the arbor, characterized by each collet comprising a cylindrical member having a base portion for contacting the hub of the arbor and an expandable portion having an inner tapered surface for mating with the outer tapered surface of a base portion of a next adjacent collet when a series of such collets are stacked in overlapping relationships on the hub,
a series of rings to be carried on said arbor in positions between each workpiece placed thereon, said rings having pin members extending from opposite faces thereof for being inserted into openings formed in the workpieces, to thereby secure the rotational positioning of each workpiece relative to the arbor.

10. The arbor of claim 9 wherein the number of expandable collets equals the number of workpieces to be held so that each workpiece is engaged in a separate collet.

11. The arbor of claim 9 and including stop means for preventing unlimited expansion of the collets in the event a collet is not restrained by a workpiece.

* * * * *